US012771108B2

(12) United States Patent
Morley et al.

(10) Patent No.: US 12,771,108 B2
(45) Date of Patent: Oct. 20, 2026

(54) CABLE MOUNTING ASSEMBLY

(71) Applicant: HellermannTyton Limited, Manchester (GB)

(72) Inventors: Graeme Morley, Newton-le-Willows (GB); Michael Chen, Liverpool (GB); Steve Blanks, Northwich (GB); Adam Butt, Havering atte Bower (GB)

(73) Assignee: HellermannTyton Limited, Manchester (GB)

( * ) Notice: Subject to any disclaimer, the term of this patent is extended or adjusted under 35 U.S.C. 154(b) by 108 days.

(21) Appl. No.: 18/932,459

(22) Filed: Oct. 30, 2024

(65) Prior Publication Data

US 2025/0141200 A1 May 1, 2025

(30) Foreign Application Priority Data

Oct. 31, 2023 (GB) ..................................... 2316677

(51) Int. Cl.
*H02G 3/32* (2006.01)
*F16L 3/137* (2006.01)
*F16L 3/24* (2006.01)

(52) U.S. Cl.
CPC ................ *H02G 3/32* (2013.01); *F16L 3/137* (2013.01); *F16L 3/24* (2013.01)

(58) Field of Classification Search
CPC ... H02G 3/32; H02G 3/30; H02G 3/26; Y10T 24/1498; F16L 3/13; F16L 3/137; F16L 3/127; F16L 3/233; F16L 3/24
USPC ..... 248/689, 65, 74.1, 74.2, 74.3, 74.4, 74.5
See application file for complete search history.

(56) References Cited

U.S. PATENT DOCUMENTS 10,208,874 B2 2/2019 Geiger et al.
11,209,030 B2 12/2021 Vaughn et al.
2018/0045337 A1 2/2018 Gallion
2023/0042349 A1 2/2023 Miraboutalebi et al.
(Continued)

FOREIGN PATENT DOCUMENTS

DE 202006001743 U1 4/2006
WO 2019032276 A1 2/2019

OTHER PUBLICATIONS

"Search Report", GB Application No. 2316677.0, Apr. 5, 2024, 4 pages.
(Continued)

*Primary Examiner* — Terrell L Mckinnon
*Assistant Examiner* — Michael McDuffie
(74) *Attorney, Agent, or Firm* — Colby Nipper PLLC

(57) ABSTRACT

A mounting assembly for securing a cable to an edge. The assembly comprises a first clamping jaw including an integral elongate locking element, and first guides laterally disposed on opposing sides of the locking element. A second clamping jaw includes a locking channel and second guides. At least one mounting aperture is arranged relative to a mounting surface such that a fastening strap may be passed through the aperture and looped over the surface to secure a cable thereto. The guides engage to align, and to guide, the jaws towards each other in a clamping direction. The locking element is insertable through the locking channel in the clamping direction. The locking element and locking channel are configured to interlock to prevent removal of the locking element from the locking channel in a direction opposite to the clamping direction, such that the jaws are held in a clamping configuration.

20 Claims, 9 Drawing Sheets

(56) References Cited

U.S. PATENT DOCUMENTS

| | | | |
|---|---|---|---|
| 2023/0092063 | A1 | 3/2023 | Villbrandt |
| 2023/0256274 | A1 | 8/2023 | Cherdo et al. |

OTHER PUBLICATIONS

"Extended European Search Report", EP Application No. 24209982.8, Mar. 11, 2025, 11 pages.

CABLE MOUNTING ASSEMBLY

INCORPORATION BY REFERENCE

This application claims priority to UK Patent Application No. GB2316677.0, filed Oct. 31, 2024, the disclosure of which is incorporated herein by this reference.

FIELD

The present disclosure relates to a mounting assembly, and in particular an edge clip for mounting cables to edges.

BACKGROUND

Edge clips are used to attach cables to protruding edges in a variety of industries, with a particular application to the automotive and marine sectors. These clips generally comprise a metallic insert housed within a polymeric body, where the body has an aperture to which a cable tie is attached to secure a cable to the clip and hence to the edge. The metallic insert is deformable such that when the clip is pushed on to an edge the metallic insert deforms, applying a force to the edge and thus retaining the clip on the edge. When applied to softer edges (e.g. polymeric edges), the metallic clips may penetrate into the edge, effectively "latching" in place. Once installed, a cable can be fixed to the clip using a cable tie.

The nature of the metal insert is such that each insert is installable only on an edge having a specific thickness to which the clip is tailored. That is to say, the width the clip corresponds and is suitable for use only with a specific edge thickness. Further, the metallic inserts can scratch and damage edges upon which they are installed, which can be undesirable. For example, this scratching can lead to more serious issues in a marine environment, where scratching the surface of underseas structures can lead to the removal of corrosion resistant paint and thus enable a route for seawater related damage.

The present disclosure seeks to address some or all of these issues or at least provide a useful alternative.

SUMMARY

According to an aspect of the present disclosure there is a mounting assembly for securing a cable to an edge. The mounting assembly comprises a first clamping jaw including an integral elongate locking element, and first guides laterally disposed on opposing sides of the locking element. The mounting assembly further comprises a second clamping jaw including a locking channel for receiving the elongate locking element, and second guides for cooperating with the first guides. The mounting assembly further comprises a mounting surface for receiving and supporting a cable, and at least one mounting aperture configured to receive a fastening strap. The at least one mounting aperture is arranged relative to the mounting surface such that the fastening strap may be looped through the at least one mounting aperture and over the mounting surface to secure a cable to the mounting surface. The first and second clamping jaws are arranged to receive an edge therebetween and are relatively movable towards each other in a clamping direction to a clamping configuration. The first and second guides engage to align the first and second clamping jaws and guide said relative movement in the clamping direction. The elongate locking element is configured to be inserted through the locking channel in the clamping direction. The elongate locking element and locking channel are configured to interlock to permit movement of the elongate locking element through the locking channel in the clamping direction and prevent removal in the reverse direction to hold the clamping jaws in the clamping configuration.

Optionally, the elongate locking element includes an engagement portion arranged to be engaged by a tensioning tool to pull the elongate locking element through the locking channel thereby pulling the clamping jaws towards each other and increasing the clamping pressure.

Optionally, the mounting surface is on at least one of the clamping jaws.

Optionally, in a first configuration the elongate locking element extends away from the first clamping jaw in a direction perpendicular to clamping axis and in a second configuration the elongate locking element is bent about a hinge portion to extend in the clamping direction.

Optionally, the elongate locking element includes a ratchet rack formation, and the locking channel includes a pawl formation for locking engagement with the ratchet rack.

Optionally, the guides of the first clamping jaw comprise at least one guide member extending from the first clamping jaw in the clamping direction and the guides of the second clamping jaw comprise at least one guide channel configured to receive said at least one guide member.

Optionally, the guides of the first clamping jaw comprise two guide arms extending from the first clamping jaw in the clamping direction and spaced laterally in a direction perpendicular to the clamping direction and the guides of the second clamping jaw comprise two correspondingly spaced guide channels configured to receive the respective guide members.

Optionally, at least one of the guide members includes a key formation and the corresponding guide channel is formed as a keyway for receiving the respective key to ensure correct alignment of the clamping jaws.

Optionally, when the first and second clamping jaws are configured such that in the clamping configuration the guides extend in the clamping direction.

Optionally, the at least one mounting aperture comprises a first aperture and a second aperture respectively disposed in the first and second clamping jaws, wherein the first and second apertures are arranged relative to the mounting surface such that in the clamping configuration said fastening strap may be looped through the first and second apertures and over the mounting surface to secure a cable to the mounting surface.

Optionally, the first and second clamping jaws are separable components.

Optionally, the first and second clamping jaws are arranged in the clamping configuration to receive the edge therebetween along an insertion axis and are arranged such that they are urged together against the edge in the clamping direction that is perpendicular to the insertion axis.

Optionally, the first and second clamping jaws include first and second clamping surfaces respectively that face each other in the clamping direction and the guides are arranged to pivotally restrain the first and second clamping jaws to maintain said arrangement as the first and second clamping jaws are urged together.

Optionally, the first and second clamping jaws each have a distal end and are configured such that the first and second clamping surfaces are angled inwardly towards each other along the insertion axis in the direction of the respective distal ends such that as the clamping jaws are moved to the clamped configuration the edge is initially engaged by the distal ends.

Optionally, the first and second clamping jaws each comprise a head section and a clamp section including the clamping surface, the clamp section extending from the head section.

Optionally, at least one of the clamp sections comprises a main body and a high friction surface portion arranged for engagement with the edge, the high friction surface portion comprising a material having a modulus lower than the elastic modulus of the main body of said clamp section. The high friction surface portion May be an elastomeric pad.

Optionally, the high friction surface portion is formed of an elastomeric material.

Optionally, the clamp sections curve inwardly towards each other along the insertion axis towards their distal ends.

Optionally, the curved clamp sections are formed of a resilient material and are configured to deform to a substantially flat configuration against the edge surface when the mounting assembly is moved to the clamping configuration.

According to an aspect of the present disclosure there is a method of securing a cable to an edge. The method comprises providing a mounting assembly and arranging the first and second clamping jaws of said mounting assembly such that an edge is received therebetween. The method further comprises inserting the elongate locking element into the locking channel, and moving the first and second clamping jaws together towards the edge in a clamping direction. The method further comprises engaging the first guides with the second guides and moving the clamping jaws to a clamping configuration in engagement with the edge. The method further comprises applying a tensioning tool to the elongate locking member to pull the elongate member through the locking channel and pull the jaws together against the edge and to increase the clamping pressure against the edge. The method further comprises arranging a cable on the mounting surface, looping a fastening strap through the at least one mounting aperture and over the cable, and tightening the fastening strap to secure the cable to the mounting surface.

According to an aspect of the present disclosure there is a mounting assembly for securing a cable or pipe to an edge, the mounting assembly comprising a clamp comprising a first clamping jaw including a first aperture and a second clamping jaw including a second aperture, the first and second clamping jaws arranged to receive an edge therebetween and movable relatively towards each other to a clamping configuration and the first and second apertures are configured to receive a fastening strap; and a mounting surface for receiving and supporting a cable; wherein in the clamping configuration the first and second apertures of the first and second clamping jaws are arranged such that said fastening strap may be looped through the first and second apertures and over a part of the mounting assembly such that tightening of the fastening strap when so looped urges the first and second clamping jaws together to clamp against the edge. The clamping configuration is a configuration in which the clamping jaws are suitably arranged to clamp to an edge. The clamping force is generated by tightening the fastening strap when the clamping jaws are in the clamping configuration. The term cable as used herein is not intended to be limiting and may include electrical cables, pipes, tubes or other elongate conduits.

In the clamping configuration the first and second apertures of the first and second clamping jaws may be arranged relative to the mounting surface such that said fastening strap may be looped through the first and second apertures and over the mounting surface to secure a cable to the mounting surface, the mounting surface being the part of the mounting assembly over which the fastening tie is looped. The fastening strap therefore advantageously secures the cable to the mounting surface and applies urges the pulls the clamping jaws together to generate the clamping force.

The mounting surface could be defined in the first jaw, the second jaw, or both the first and second jaws without affecting the functionality of the edge mounting assembly. The mounting assembly may have at least one further mounting surface. The further mounting surface may be spaced apart from the first mounting surface and may be arranged such that another cable is secured to said further mounting surface.

The first and second clamping jaws may be separable components. It will be appreciated that separable components refers to the first and second jaws being independent components. By comprising three separate components (first jaw, second jaw and fastener strap) the clips can be easily dismantling after being installed on an edge. By releasing or cutting the fastener, the jaws are no longer urged against the edge and are unconnected, leading to them being easily pulled away from the edge and the release of the cable.

The first and second clamping jaws may include complimentary guides that engage to align the first and second clamping jaws as they are moved to the clamping configuration.

The first and second clamping jaws may include first and second clamping surfaces respectively that are arranged substantially perpendicular to the clamping direction in face inwardly in the clamping direction. The clamping surfaces are arranged in a substantially parallel spaced relationship in the clamping configuration and the guides may be arranged to pivotally restrain the first and second clamping jaws to maintain the first and second clamping surfaces in said parallel relationship as the first and second clamping jaws are urged together. That is to say the guides prevent the upper ends, or heads, of the clamping members pivoting towards each other, which would cause the distal ends to pivot apart away from the edge.

The first and second clamping jaws may each have a distal end which in use are arranged at the opening to the clamp, and are configured such that the first and second clamping surfaces are angled inwardly towards each other along the insertion axis in the direction of the respective distal ends. The spacing of the clamping jaws is therefore narrower at the opening. As a result, the clamping jaws are moved to the clamped configuration the edge is initially engaged by the distal ends with the clamping surfaces oriented in a v-shaped arrangement. As the fastening strap is tightened the proximal ends of the clamping jaws are pulled together and the clamping surfaces abut opposing sides of the edge in a more parallel arrangement. This angled relationship of the clamping surfaces advantageously increases the pull force required to remove the clamp from the edge.

The first and second clamping jaws may be arranged in the clamping configuration to receive the edge therebetween in an insertion direction along an insertion axis and may be arranged such that they are urged together against the edge in a clamping direction that is perpendicular to the insertion direction.

The first and second apertures may extend through the first and second clamping jaws respectively in the clamping direction.

When the first and second clamping jaws are arranged in the clamping configuration the guides may extend in the clamping direction.

The guide formation of the first clamping jaw may comprise two guide members formed as arms extending from the first clamping jaw in a spaced relationship and the guide formation of the second clamping jaw may comprise two correspondingly spaced guide channels respectively configured to receive the at least one corresponding guide member.

By having a guide member and receiving guide channel, the first and second jaw can be located relative to one another with ease, and further ensure linear engagement between the first and second jaw maintaining each jaw in a constant alignment. The guide member and guide channel beneficially act synergistically with the fastener strap to tighten the jaws against an edge; whilst maintaining a relative relationship (e.g. parallel relationship) between the first and second jaws.

The mounting assembly may comprise two guide members formed as arms extending from spaced apart locations of the first clamping jaw and two spaced apart guide channels formed in the second jaw, each for receipt of a corresponding guide member. Guide members are beneficially arranged at opposing corresponding sides of the second clamping jaw. The guide members beneficially extend from spaced apart locations on opposing sides and extend parallel to one another.

The or each guide member may include a key and the or each corresponding guide channel may be formed as a keyway for receiving the respective key. By including a key and a keyway, all motion is restricted except for the linear sliding motion of the key entering the keyway.

The first and second clamping jaws may each include a head section and a clamp section extending from the head section, and the apertures are arranged such that the fastening strap is looped over the head sections. The head sections of the first and second clamping jaws may each include a curved recess, the recesses combining in the clamping configuration to form a concave channel defining the mounting surface.

The first and second apertures may be formed in the head sections of the first and second clamping jaws respectively.

At least one of the clamping surfaces may have a frictional surface for engagement with an edge.

It will be appreciated that a frictional surface is a surface that generates friction between the clamping face and the edge. Non-limiting examples of a frictional surface are textured or deformable surfaces that interact with the surface of the edge.

A plurality of projections may extend from at least one of the clamping faces.

It will be appreciated that the term projections refers to features that extend from the clamping face, where these projections may be deformable. More deformable projections may induce a frictional force at the clamping face and/or may interact with protrusions/deformities of the edge. Less deformable projections may comparatively be more reliant on interacting or deforming the protrusions/deformities of an edge.

At least one of the clamping faces may comprise an elastomeric material. Where existing metallic edge clips can scratch and damage edges, an elastomeric clamping face that is compressed onto surfaces will cause no damage and will generate friction to retain the clip in place.

The fastening strap may be a cable tie having a head section with a strap receiving aperture formed therein, and at least one of the first and second clamping jaws may comprise a head recess configured to receive and retain the head section of a cable tie such that the head section is aligned with the aperture of said at least one clamping jaw. By retaining the head section within the mounting assembly the installation of the mounting assembly on an edge is improved. It will be appreciated that the head recess could be located in the first jaw, the second jaw, or could be located in both the first and second jaws, without affecting the technical effect of the head recess.

According to an aspect of the present disclosure there is a mounting assembly for securing a cable to an edge, the mounting assembly comprising a clamp, at least one mounting aperture configured to receive a fastening strap, and a mounting surface for receiving and supporting a cable, the clamp comprising a first clamping jaw including a first engagement formation, and a second clamping jaw including a second engagement formation, the first and second clamping jaws arranged to receive an edge therebetween and are movable relatively towards each other to a clamping configuration, wherein the first and second engagement formations are arranged and configured to interlock when the clamping jaws are moved to the clamping configuration to retain the first and second clamping jaws together, and the at least one mounting aperture is arranged relative to the mounting surface such that said fastening strap may be looped through said at least one mounting aperture and over the mounting surface to secure a cable to the mounting surface.

The first and second jaws may include a first mounting aperture and a second aperture respectively.

The first engagement formation may extend from the first clamping jaw and the second aperture is arranged to receive the first engagement formation in the clamping configuration.

Tightening of the fastening strap when so looped may urge the first and second clamping jaws together to clamp against the edge.

The first engagement formation may comprise a ratchet rack and the second engagement formation may comprise a pawl for engagement with the ratchet rack.

The ratchet rack may be formed as an elongate tongue projecting from the first clamping member in the clamping direction.

The ratchet rack may be formed to have geometry substantially similar to a cable tie strap such that the ratchet rack is grippable by a cable tie tensioner.

All optional features of the present disclosure are optional features of any aspect of the present disclosure.

The first engagement formation may extend in a direction parallel to the clamping direction. The first engagement formation preferably extends substantially parallel to the guides (when present). The first engagement formation is preferably spaced from the guides, which are laterally disposed on opposing sides of the engagement formation.

According to an aspect of the present disclosure there is a kit comprising a mounting assembly as hereinbefore described and a fastening strap, wherein said fastening strap is configured to be received through the first and second apertures and looped over said mounting surface to secure a cable received on said mounting surface.

According to an aspect of the present disclosure there is a method of securing a cable to an edge, the method comprising providing a mounting assembly comprising a clamp comprising a first clamping jaw including a first aperture, a second clamping jaw including a second aperture, and a mounting surface; arranging the first and second clamping jaws such that an edge is received therebetween and moving said first and second clamping jaws together to a clamping configuration; arranging a cable on the mounting surface; and looping a fastening strap through the first and second apertures and over the cable, and tightening the fastening strap to secure the cable to the mounting assembly and to urge the first and second clamping jaws together against the edge.

BRIEF DESCRIPTION OF THE DRAWINGS

The present disclosure will now be described by way of example only with reference to the following illustrative figures in which.

DESCRIPTION OF EMBODIMENTS

The following description presents exemplary embodiments and, together with the drawings, serves to explain principles of the disclosure. The scope of the disclosure is not intended to be limited to the precise details of the embodiments or exact adherence with all method steps. Variations will be apparent to a skilled person and are deemed also to be covered by the description. Terms for features used herein should be given a broad interpretation that also encompasses equivalent functions and features. In some cases, several alternative terms (synonyms) for structural features have been provided but such terms are not intended to be exhaustive.

Descriptive terms should also be given the broadest possible interpretation; e.g. the term “comprising” as used in this specification means “consisting at least in part of” such that interpreting each statement in this specification that includes the term “comprising”, features other than that or those prefaced by the term may also be present. Related terms such as “comprise” and “comprises” are to be interpreted in the same manner. Directional terms such as “vertical”, “horizontal”, “up”, “down”, “upper” and “lower” are relative terms that may be used for convenience of explanation usually with reference to the illustrations and are not intended to be ultimately limiting if an equivalent function can be achieved with an alternative dimension and/or direction.

The description herein refers to embodiments with particular combinations of configuration steps or features. However, it is envisaged that further combinations and cross-combinations of compatible steps or features between embodiments will be possible. The description of multiple features in relation to any specific embodiment is not an indication that such features are inextricably linked, and isolated features may function independently from other features and not necessarily require implementation as a complete combination.

Figure 1:
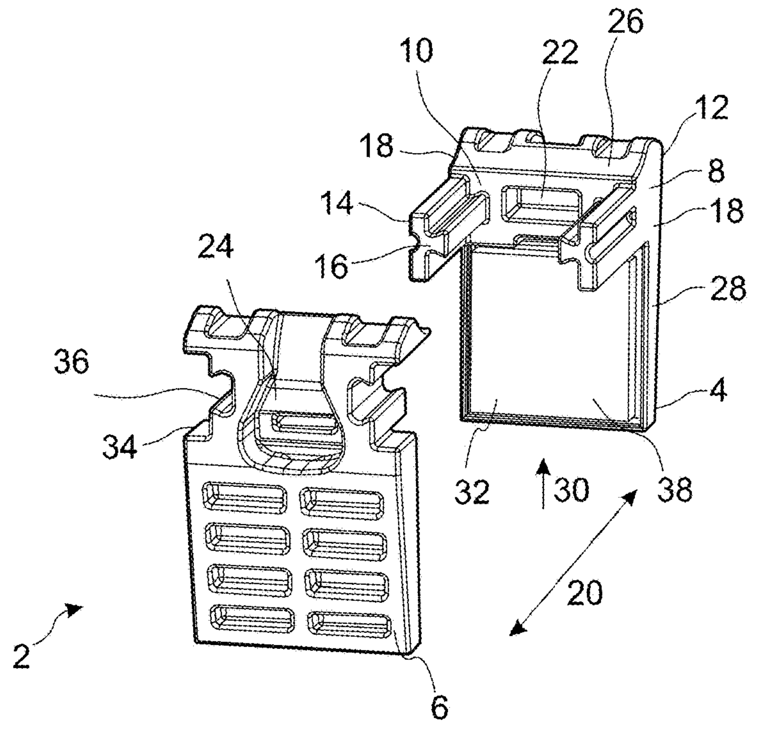
FIG. 1 shows a schematic perspective representation of a mounting assembly in an unclamped configuration, according to an embodiment of the present disclosure.

Referring to FIG. 1, a first embodiment of an edge mounting assembly 2 having two separate jaws 4, 6 arranged in an uncoupled (i.e. unclamped) configuration is shown. The first jaw 4 has a head portion 8 (also referred to as a head section) and a clamp portion 28 (also referred to as a clamp section) extending from the head portion. The head portion has a front face 10 and rear face 12, with two guide members in the form of arms 14 having integral keys 16 extending forwardly from opposing spaced apart sides 18 of the front face 10 in a clamping direction 20.

An aperture 22 is located between the two arms 14 and passes through the head portion 8 from the front face 10 to the rear 12 face. The longitudinal length of the aperture 22 is aligned parallel with the arms 14. A head recess 24 for a cable tie head 44 is formed into the rear face 12 of the head portion 8. The head recess 24 is aligned with the aperture 22 and configured to have the inverse geometry of a cable tie head 44 (i.e. the portion of the cable tie 46 encasing the pawl). The head recess 24 is arranged such that when a cable tie head is received in the head recess 24 the strap or tape receiving aperture of the cable tie is aligned with the aperture 22. A recess in the form of a concave surface 26 is defined on the top of the head portion 8 and curves downwardly from the rear face 12 towards the front face 10. The radius of the concave surface 26 corresponds to the radius of a cable to be supported by the mounting assembly 2. It will be appreciated that whilst a concave surface 26 may best reflect the geometry of a cable 50, any surface suitable for receiving a cable 50 could be used.

A clamp portion 28 extends from the head portion 8 perpendicular to the arms 14. Inset into the clamp portion 28, and positioned on the front of the jaw 4 (i.e. the surface of the clamping jaw that faces the edge in use), is an elastomeric pad 32 for engaging with a surface. A second jaw 6 is shown in FIG. 1 opposite the first jaw 4 with substantially the same configuration as the first jaw 4. The second jaw 6 includes two guide channels 34, in place of the arms 14. Each guide channel 34 is formed with integrated keyways 36. Each of the keyways 36 is configured and arranged to receive a key 16 of a corresponding guide arm of the first jaw 4. Each of the elastomeric engagement pads 32 has a forwardly facing clamping surface 38, with these surfaces 38 defined in a plane perpendicular to the clamping direction 20.

An edge 40 (not shown in FIG. 1) can be received between the first and second jaws 4, 6 of the mounting assembly 2. The mounting assembly 2 can enter engagement with an edge 40 by translating the mounting assembly 2 downwards in a direction opposite to the insertion direction, so that the edge is received between the two clamp portions 28, or the first and second jaws 4,6 may be brought together and assembled from opposing sides of the edge. The first and second jaws 4, 6 are then brought toward each other such that the arms 14 enter the guide channels 34. Continued movement of the jaws 4, 6 toward one another causes the clamping surfaces 38 of the engagement pads 32 to contact opposing faces of the edge 40. Once the first and second jaws 4, 6 have coupled together by virtue of the arms 14 being received in the guide channels 34, the two concave surfaces 26 combined to define a mounting surface 42 against which a cable may be seated and against which the cable is secured with a cable tie.

Figure 2:
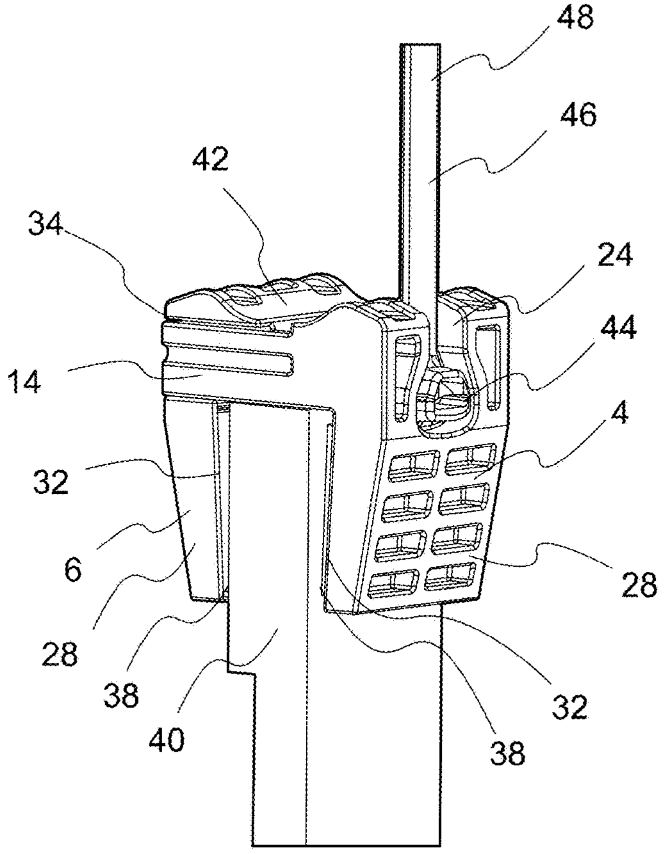
FIG. 2 shows a schematic perspective representation of a mounting assembly with an edge retained between first and second jaws, according to an embodiment of the present disclosure.

Referring to FIG. 2, the mounting assembly 2 is shown in a coupled configuration, i.e. assembled but without tightening or securement of a cable tie 46 to effect clamping, as will be described in further detail below. The arms 14 of the first jaw 4 are inserted into the guide channels 34 of the second jaw 6, and the edge 40 is located between the clamp portions 28 of the first 4 and second 6 jaws. The keys 16 of the arms 14 interlock with the corresponding keyways 36 of the guide channels to hold and retain the arms 14 within the guide channels 34. The clamping surfaces 38 of the engagement pads 32 of the first 4 and second 6 jaws are in engagement with opposing faces of the edge 40. The head 44 of a cable tie 46 is received within the head recess 24 of the first jaw 4 such that the strap 48 portion of the cable tie 46, also referred to as the tape, extends upwardly away from the mounting assembly 2 without passing through the apertures 22 of the first 4 or second 6 jaws, or through the head 44 of the cable tie 46. In this configuration the mounting assembly 2 is arranged to receive the cable on the mounting surface 42.

Figure 3:
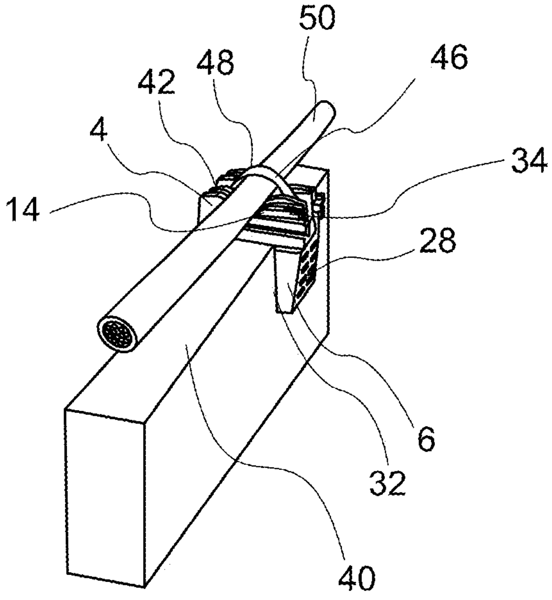
FIG. 3 shows a schematic perspective representation of a mounting assembly in a clamping configuration, according to an embodiment of the present disclosure.

Referring to FIG. 3, the mounting assembly 2 is shown in a clamped configuration with a cable 50 secured against the mounting surface 42. From the coupled configuration (FIG. 2), where the arms 4 of the first jaw are located in the guide channels 34 of the second jaw, a cable 50 is placed onto the mounting surface 42. The tape portion 48 of the cable tie 46 is passed over the cable 50. The distal end of the tape portion 48 is then inserted through the apertures 22 of the first 4 and second 6 jaws, and finally through the head 44 of the cable tie 46. It is well known that the tape portion 48 of a cable tie 46 has a toothed, ratchet rack defined on it and by passing this tape portion 48 past the pawl of the cable tie head 44 the cable tie 46 is tightened, with the pawl engaging with the ratchet rack to prevent retraction of the tape 48. Tightening of the cable tie, which may be achieved using a tensioning gun, secures the cable 50 to the mounting surface 42, and when the mounting assembly 2 is not in engagement with an edge 40, tightening of the cable tie 46 causes the first 4 and second 6 jaws to move together.

In the coupled configuration the edge 40 is in engagement with the engagement pads 32. Consequently, tightening of the cable tie 46 cannot further translate the jaws 4, 6 towards one another but increased tightening acts to increase the clamping pressure. As the apertures 22 are located above the clamp portion 28, tightening also leads to a rotational moment being generated between the engagement pads 32 and cable tie 46, as the edge 40 acts against the tightening of the cable tie 46. However, as the apertures 22 are located between the arms 14 and the channels 34, and said arms 14 and channels 34 are in engagement with one another, the arms 14/channels 34 generate an opposing rotational moment. By cancelling out the rotational moments, a reaction force is instead generated at the engagement pads 32, urging the pads 32 against the edge 40. The ratchet rack and pawl of the cable tie 46 act together to lock the cable tie 46 at a tightened position, clamping the mounting assembly 2 to the edge 40.

Figure 4:
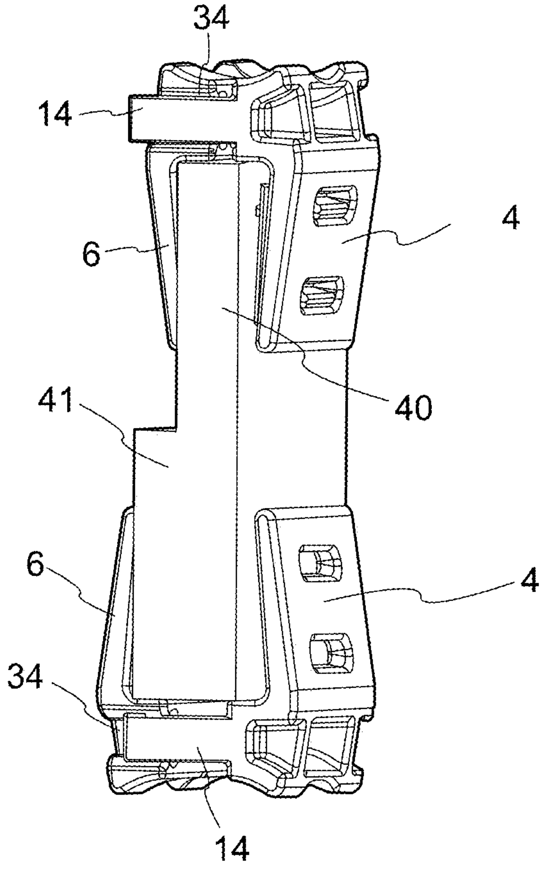
FIG. 4 shows a schematic perspective representation of two mounting assemblies each in a clamping configuration on edges with differing thicknesses, according to an embodiment of the present disclosure.

Referring to FIG. 4, two mounting assemblies 2 are shown in coupled configurations, each mounted on a different edge 40, 41 having different thickness. The geometry of the mounting assemblies 2 are the same. However, the arms 14 of each mounting assembly 2 are at differing levels of insertion through the channels 34. This varying level of insertion enables the mounting assembly 2 to still function correctly when clamping to edges 40, 41 of differing thickness.

Figure 5:
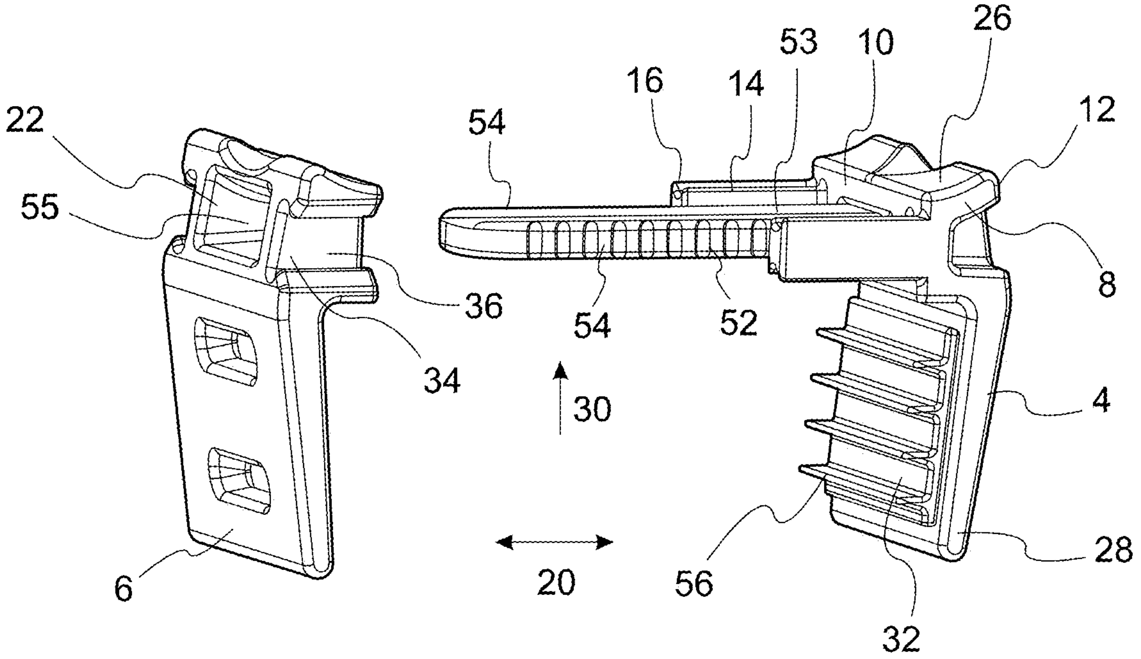
FIG. 5 shows a schematic perspective representation of a mounting assembly in an unclamped configuration, according to another embodiment of the present disclosure.

Referring to FIG. 5, a second embodiment of an edge mounting assembly 2 is shown in an uncoupled configuration. For ease of reference features common with the first embodiment are assigned the same reference numerals. As with the first embodiment, the mounting assembly 2 has a first 4 and second 6 jaw. The first jaw 4 has a head portion 8 with a front 10 and rear 12 face, a clamp portion 28 extending downwardly in an insertion direction 30 from the head portion 8 having an elastomeric engagement pad 32 inset into it. Two guide members are provided in the form of arms 14 with integrated keys 16 extending forwardly in a clamping direction 20 from the front face 10; the clamping 20 and insertion directions 30 being perpendicular. Further, a concave surface 26 is defined on the top of the head portion 8.

A series of formations 56 extend from the engagement pad 32 substantially parallel to the arms 14 such that when the engagement pad 32 enters engagement with an edge 40 the formations 56 deform to better engage with the edge 40. However, it will be appreciated that other surface configurations may alternatively be used. Also extending from the head portion 8 of the first jaw 4 is a first engagement formation in the form of a ratcheting member 52 extending parallel to and spaced between the arms 14. The ratcheting member 52 includes gear racks 54 arranged along its sie edges. The spacing of the ratcheting member 52 from the arms 14 causes a channel to be formed between the ratcheting member 52 and each of the arms 14 such that three separate formations extend from the head portion 8 where the channel receives a section of the head 8 defined between the channel 34 and aperture 22.

The second jaw 6 is substantially the same as the first jaw 4, except for the provision of guide channels 34 having integrated keyways 36 to receive the arms 14 and integrated keys 16 of the first jaw 4. The aperture 22 includes pawls 55 located at opposing sides of the aperture for engaging with the gear racks 54 of the ratcheting member 52. The ratcheting member 52 includes a channel 53 formed along its upper surface having a width and depth suitable for receiving the tape portion of a cable tie. The channel 53 extends through the head of the second jaw to its rear face allowing a cable tie to be passed through the channel and along the upper surface of the ratcheting member 52.

As with the first embodiment, when moved to a clamping configuration, the arms 14 of the first jaw 4 are received by the guide channels 34 of the second jaw 6, and the ratcheting member 52 is received by the aperture 22 of the second jaw 6. The relative larger width of the aperture 22 compared to the ratcheting member 52 enables a cable tie 46 to still be passed through both apertures 22 even when the ratcheting member 52 is inserted into the aperture 22 of the second jaw 6. As the ratcheting member 52 is inserted through the aperture 22 of the second jaw 6, the pawls 55 engages with each gear racks 54 preventing removal of the ratcheting member 52 from the aperture 22 of the second jaw 6, whilst still allowing the first 4 and second 6 jaws to tighten together. This allows the mounting assembly 2 to be located on an edge 40 and tightened prior to the insertion of a cable tie 46. A tensioning gun may be used to pull the ratcheting member 52 through the aperture 22 and increase the clamping pressure. As the formations 56 of the engagement pads 32 enter engagement with the edge 40 they deform, spreading load into the edge 40. The increased deformation enables the engagement pad 32 to better conform to the geometry of an edge 40 and thus improves engagement with the edge 40.

When the mounting assembly 2 has been clamped to an edge the tape portion for a cable tie may be passed through the channel 53 and through the aperture 22. A cable is located on the mounting surface 42, and the tape portion of the cable is looped over the cable and inserted into the head of the cable tie. Tightening of the cable tie secures the cable to the mounting surface 42.

Figure 6:
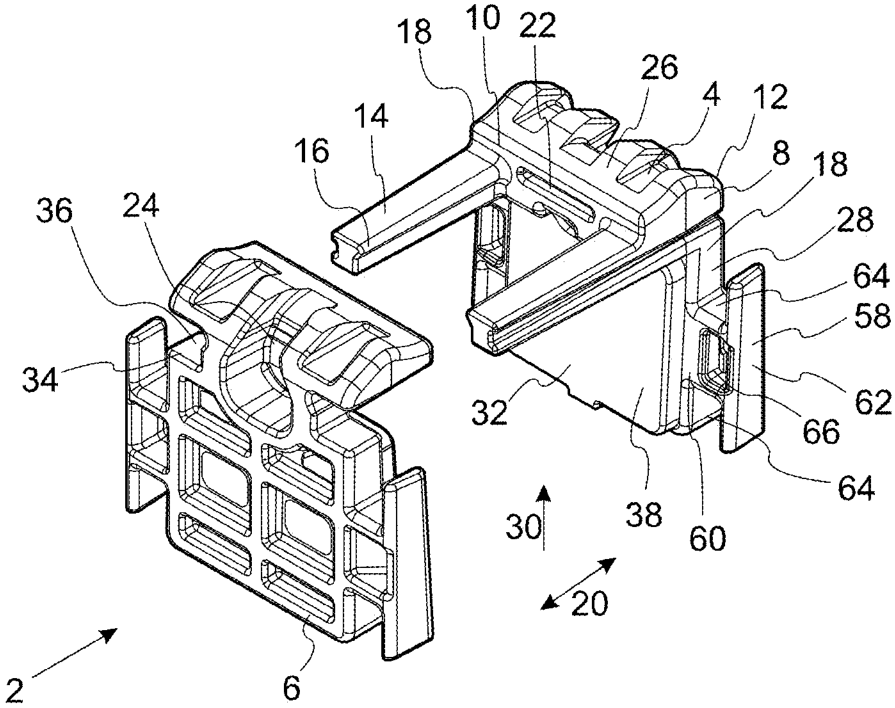
FIG. 6 shows a schematic perspective representation of a mounting assembly in an unclamped configuration, according to an embodiment of the present disclosure.

Referring to FIG. 6, a third embodiment of an edge mounting assembly 2 is shown in an uncoupled configuration. As with the first embodiment, the mounting assembly 2 has a first 4 and second 6 jaw. The first jaw 4 has a head portion 8 with a front 10 and rear 12 face, a clamp portion 28 extending downwardly opposite to the insertion direction 30 from the head portion 8 and having an elastomeric engagement pad 32 inset into it, and two guide members in the form of arms 14 with integrated keys 16 extending forwardly in a clamping direction 20 from the front face 10; the clamping 20 and insertion directions 30 being perpendicular. A concave surface 26 is defined on the top of the head portion 8, and an aperture 22 passes through the head portion 8 from the front 10 to rear 12 face.

Mounting formations 58 extend from opposing sides of the clamp portion 28, in a direction perpendicular to the clamping direction 20. The mounting formations are T-shaped, with the stem 60 of each T-shape connected to the clamp portion 28 such that the top 62 of each T-shape is spaced apart from the clamp portion 28. Due to this spacing, two mounting channels 64 (the length of each aligned with the aperture 22) are formed between the clamp portion 28 and the top 62 of each mounting formation 58. A secondary aperture 66 passes through the stem 60 of each mounting formation 58 and is aligned with the mounting channels 64. The second jaw 6 is substantially the same as the first jaw 4, except for the provision of guide channels 34 having integrated keyways 36 to receive the arms 14 and integrated keys 16 of the first jaw 4.

Figure 7:
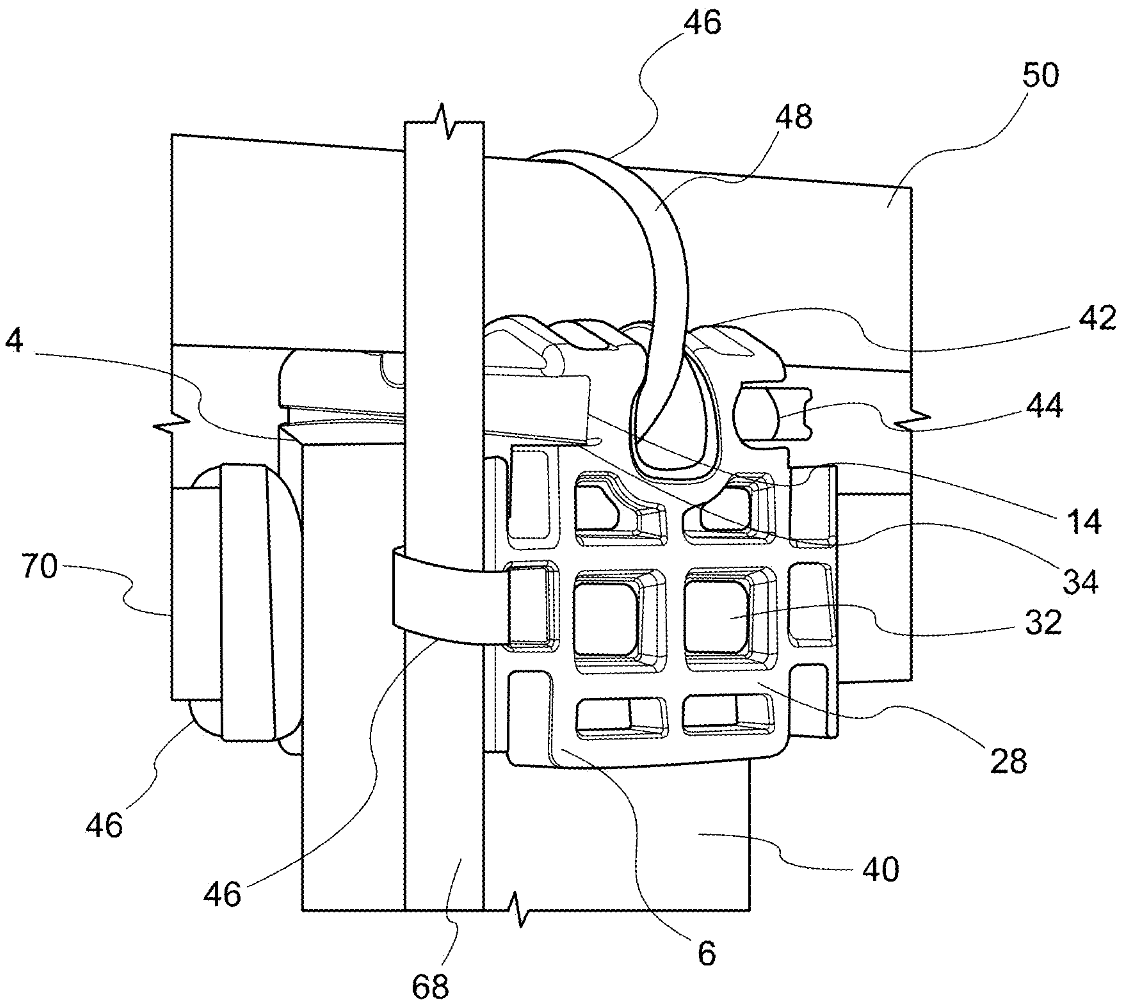
FIG. 7 shows a schematic perspective representation of a mounting assembly such as presented in FIG. 6 in a clamping configuration clamping multiple cables, according to an embodiment of the present disclosure.

Referring to FIG. 7, as with the first embodiment, when moved to a clamping configuration the arms 14 of the first jaw 4 are received by the guide channels 34 of the second jaw 6. An edge 40 is received between the first and second jaws4, 6 and a cable 50 is placed on to the mounting surface 42. The tape portion 48 of a cable tie 46 is then passed through the aperture 22 of the first jaw 4, the aperture 22 of the second jaw 6, and then over the cable 50, before being inserted into the head 44 of the cable tie 46 and tightened to secure the cable 50 in place. Further to the first embodiment, the T-shaped mounting formations 58 enable additional cables 68, 70 to be mounted to the same mounting assembly 2. A second cable 68 can be arranged perpendicular to the first cable 50 and adjacent to the top 62 of the mounting formation 58. The tape portion 48 of a second cable tie 46 may then be passed over the second cable 68, through the secondary aperture 66 of said mounting formation 58, and then inserted through the head 44 of the second cable tie 46 before being tightened to secure the second cable 68 in place. A third cable 70 can be arranged parallel to the first cable 50 and adjacent to the back of a clamp portion 28, such that the third cable 70 runs alongside each of the mounting formations 58 of said clamp portion 28. The tape portion 48 of a third cable tie 46 may then be passed over the third cable 70, over both mounting channels 64 of one of the mounting formations 58, and then inserted through the head 44 of the third cable tie 46, before being tightened to secure the third cable 70 in place. Optionally, a fourth cable tie (not shown) may be used to secure the third cable 70 to the mounting channels 64 of the other mounting formation 58, to increase the securement of the third cable 70.

Figure 8:
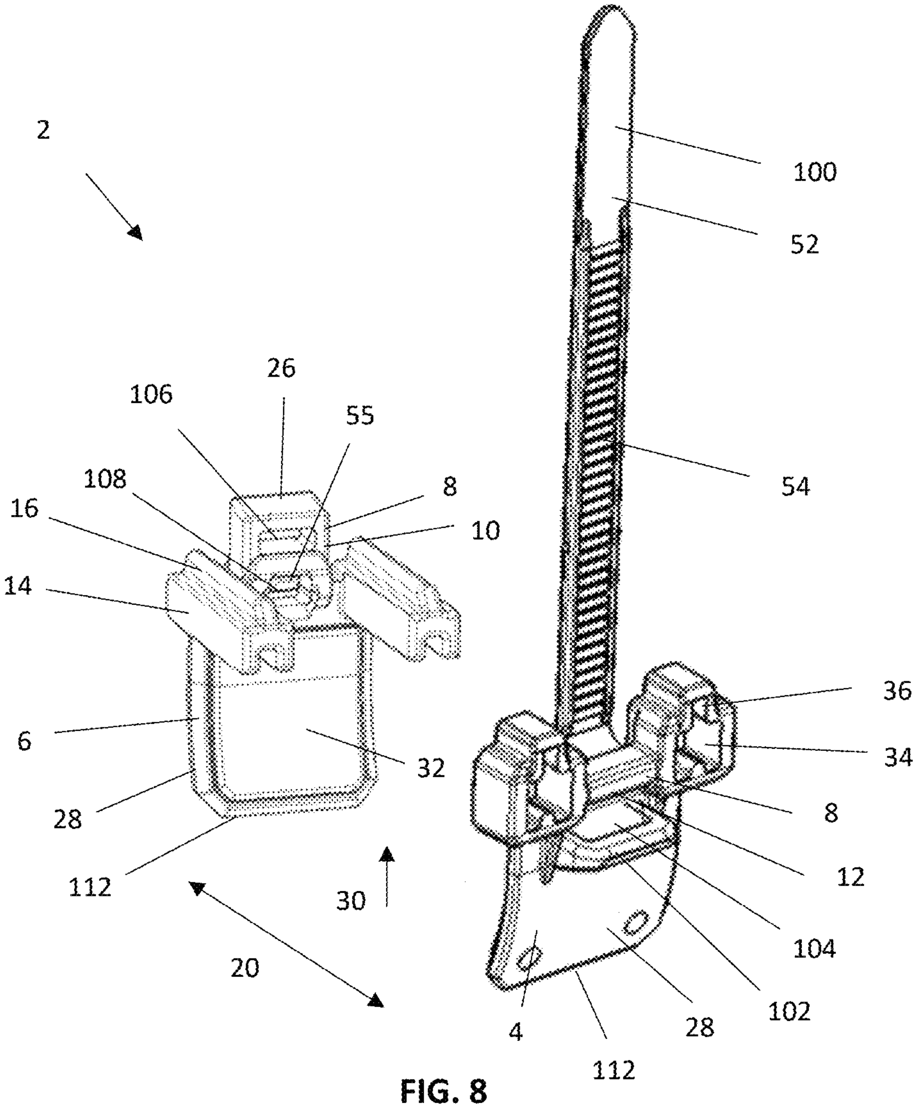
FIG. 8 shows a schematic perspective representation of a mounting assembly in an unclamped configuration, according to an embodiment of the present disclosure.

Referring to FIG. 8, a fourth embodiment of an edge mounting assembly 2 is shown in an uncoupled configuration. For ease of reference features common with the first embodiment are assigned the same reference numerals. As with the first embodiment, the mounting assembly 2 has a first 4 and second 6 clamping jaw. The first jaw 4 has a head portion 8 with a front 10 and rear 12 face, and a clamp portion 28 initially extending downwardly from the head portion 8 in an insertion direction 30. The clamp portion 28 has an elastomeric engagement pad 32 inset into it. Two guide channels 34 having integrated keyways 36 extend through the head portion 8 in a clamping direction 20; the clamping 20 and insertion directions 30 being perpendicular to each other.

Extending from the head portion 8 of the first jaw 4 is a first engagement formation in the form of an elongate ratcheting member (strap) 52 extending upwardly from and spaced between the guide channels 34. By virtue of the ratcheting member 52 extending upwardly the first jaw 4 has a reduced overall thickness. This improves manufacturability and has improved mouldability. The ratcheting member 52 is flexible in nature and can be bent downwardly about a hinge portion adjoining the head portion 8 such that it extends in the clamping direction 20 parallel to the guide channels 34. By virtue of the ratcheting member 52 extending parallel to the guide channels 34 the edge clamp assembly 2 has a lower profile. This is important in automotive applications, where space and access can be limited. Furthermore, this parallel relationship transfers more of the tensioning force in the clamping direction 20. This avoids the jaws 4,6 splaying open, which would happen should a non-parallel (or angled) relationship exist; as a moment of force would be induced closer towards the edge in this non-parallel relationship.

The ratcheting member 52 includes a gear rack 54 arranged along its upper surface 100. The spacing of the ratcheting member 52 from the guide channels 34 causes a channel to be formed between the ratcheting member 52 and each of the guide channels 34 such that the ratchetting member 52 is a separate formation extending from the head portion 8. The first jaw 4 has a mounting protrusion 102 extending from the rear of the clamp portion 28. The mounting protrusion 102 has an aperture 104 extending therethrough in the insertion direction 30. A cable tie can be passed through this aperture to enable the mounting of an additional cable(s) to the mounting protrusion 102. Mounting protrusions discussed herein can be readily adapted for any of the described embodiments.

The second jaw 6 is substantially the same as the first jaw 4, except for the provision of guide arms 14 with integrated keys 16 to pass into the guide channels 34 and integrated keyways 36 of the first jaw 4. The second jaw 6 includes a first aperture 106 for the receipt of a cable tie, and a second aperture 108 defining a locking channel for receipt of the ratchetting member 52. The second aperture 108 includes an integrally moulded pawl 55, located away from the clamp portion 28, for engaging with the gear rack 54 of the ratcheting member 52. Further, a concave surface 26 is defined on the top of the head portion 8 for receiving a cable.

The clamp portions 28 have an inwardly curving form. The clamp portions 28 initially extend from the head portions in the insertion direction 30. As they continue to extend in the insertion direction 30 they also begin to curve inwardly in the clamping direction 20 towards the other clamp portion 28. The clamp portions 28 are formed of a resilient material and the curvature of the clamp portions 28 is selected such that when the edge mounting assembly 2 is tightened against an edge the curved clamp portions deform into a substantially flat configuration, in that they extend substantially in the insertion direction 30 with the clamping surfaces parallel to the insertion direction and parallel with the edge surface against which they are clamped. The outward deformation of the distal ends 112 of these clamp portions 28 results in the generation of inwardly biassed force over the length of the elastomeric engagement pads 32. This improves the contact between the edge mounting assembly 2 and the edge, where the absence of these curved portions may lead to uneven clamping forces over the length of the elastomeric pads 32. Furthermore, this curving reduces misalignment and enables better accommodation of uneven edges compared with flat clamp portions.

Figure 9:
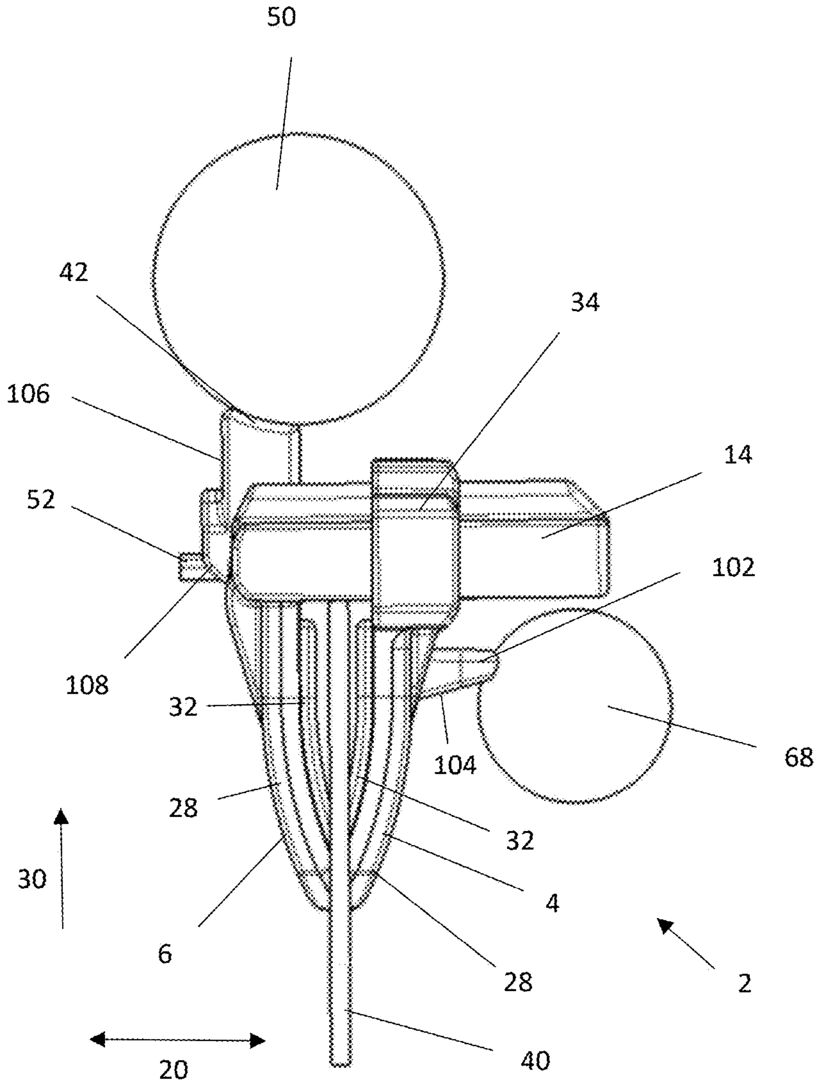
FIG. 9 shows a schematic perspective representation of a mounting assembly such as presented in FIG. 8 in a clamping configuration clamping multiple cables, according to an embodiment of the present disclosure.

Referring to FIG. 9, the fourth embodiment is shown installed on an edge 40. When moved to the clamping configuration, the arms 14 of the second jaw 6 are received by the guide channels 34 of the first jaw 4, and the ratcheting member 52 is received by the second aperture 108 of the second jaw 6. As the ratcheting member 52 is inserted through the second aperture 108, the pawl 55 engages with the gear rack 54 preventing removal of the ratcheting member 52 from the second aperture 108, whilst still allowing the first 4 and second 6 jaws to tighten together. This allows the mounting assembly 2 to be located on an edge 40 and tightened prior to the insertion of a cable tie. Initially the clamping jaws 4.6 may be hand tightened by pulling the elongate clamping member through the clamping channel. Sufficient clamping force may be achieved by hand for the clamping jaws to be retained on the edge. A tensioning gun may then be used to pull the ratcheting member 52 through the second aperture 108 and increase the clamping pressure. As the engagement pads 32 are urged into engagement with the edge 40 the clamp portions 28 deform. During and after the deformation of the clamp potions the engagement pads 32 also deform to spread load into the edge 40. The ratchetting member 52 may then be severed (as shown) at a location adjacent the second aperture 108 of the second jaw 6 to provide a more compact edge mounting assembly 2.

The strap portion of a cable tie (not shown) can be passed through the first aperture 106, looped over a cable 50 located on the mounting surface 42, and inserted into the head of the cable tie. The resultant looped cable tie can then be tightened to secure the cable 50 to the mounting surface 42. The strap portion of a second cable tie (not shown) can be passed through the aperture 104 of the mounting protrusion 102, over a second cable 68 located upon the mounting protrusion 102, and inserted into the head of the second cable tie. The resultant looped second cable tie can be tightened to secure the second cable 68 to the mounting protrusion 102. Due to the aperture 104 of the mounting protrusion 102 extending in the insertion direction 30 the first 50 and second 68 cables are supported in a substantially parallel relationship.

Figure 10:
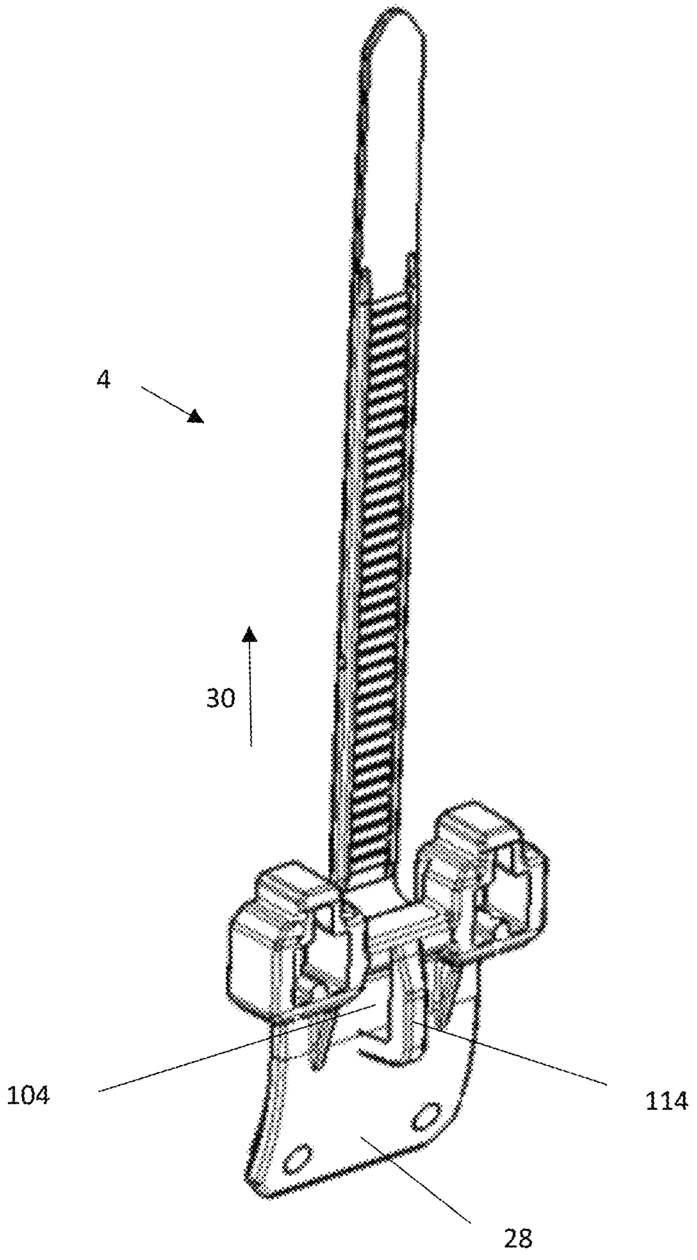
FIG. 10 shows a schematic perspective representation of a jaw of a mounting assembly, according to an embodiment of the present disclosure.
Figure 11:
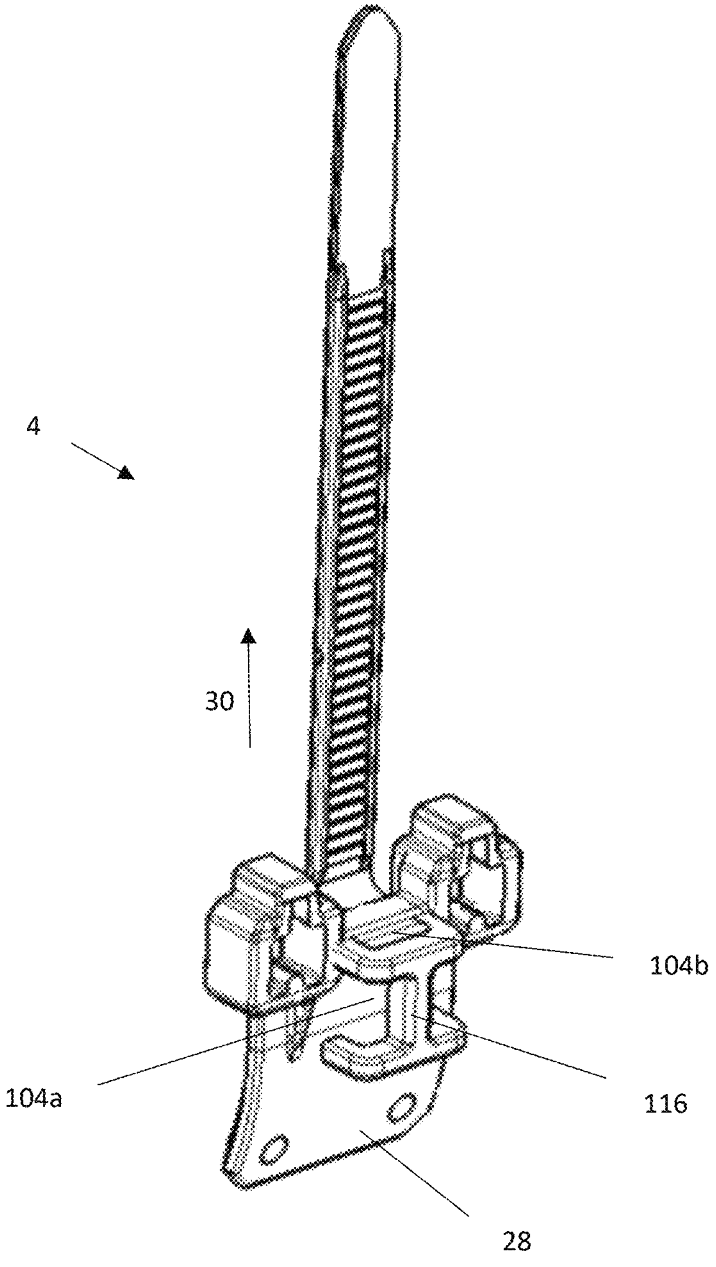
FIG. 11 shows a schematic perspective representation of a jaw of a mounting assembly, according to an embodiment of the present disclosure.

FIGS. 10 and 11 shows first jaw 4 of the embodiment of FIGS. 8 and 9 with alternate mounting protrusions 114, 116. As with the first jaw 4 shown in FIGS. 8 and 9, the first jaws 4 shown in FIGS. 10 and 11 have mounting protrusions 114, 116 respectively extending from the rear of the clamp portion 28. However, the aperture 104 of the mounting protrusion 114 shown in FIG. 10, extends across the rear face of the jaw 4 in a direction perpendicular to the insertion direction 30. Thus, instead of supporting a cable 68 parallel to the cable 50 received upon the concave surface 42, a cable 68 is supported perpendicular to the cable 50 received upon the concave surface 42. The mounting protrusion 116 shown in FIG. 11 enables the support of a cable 68 in either a parallel or perpendicular relationship with the cable 50 received upon the concave surface 42, with two apertures 104*a*, 104*b* respectively extending parallel to, and perpendicular to, the insertion 30 direction.

Figure 12:
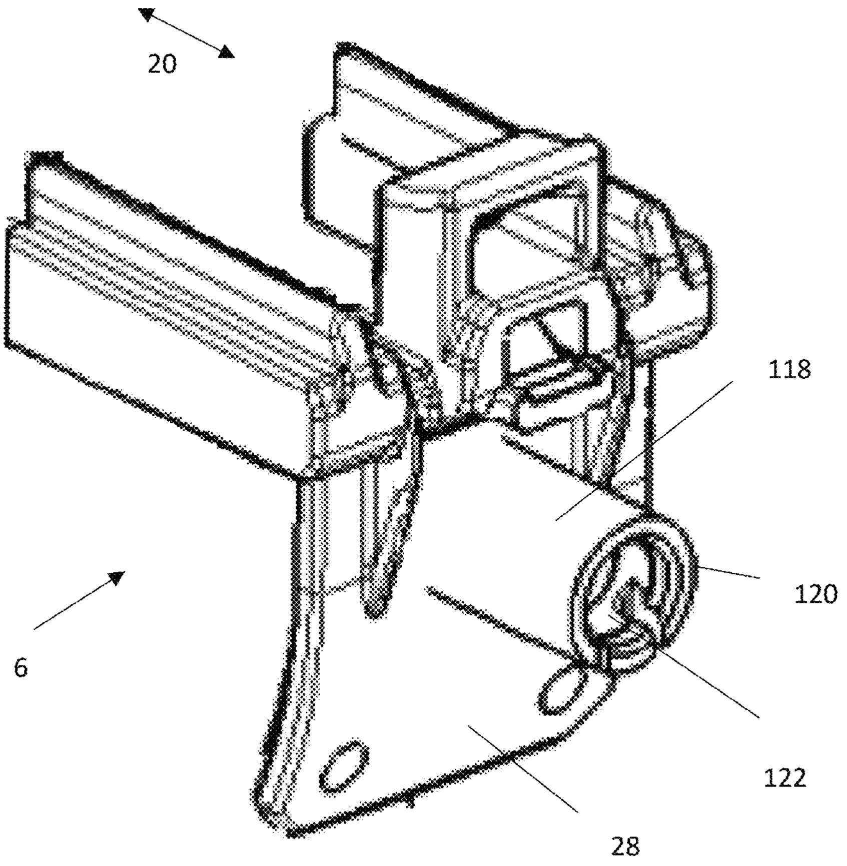
FIG. 12 shows a schematic perspective representation of a jaw of a mounting assembly, according to an embodiment of the present disclosure.

FIG. 12 shows the second jaw 6 modified to include a modular mounting protrusion 118. The modular mounting protrusion 118 is substantially cylindrical in nature and extends axially in the clamping direction 20 from the rear of the clamp portion 28 to a distal end 120. The distal end 120 has a mounting recess 122 disposed therein for receipt of a modular fixture (not shown). This modular fixture may take the form of a modified cable tie, or another device that is mountable to the mounting recess 122. It will be appreciated that the mounting protrusions 102, 114, 116, 118 shown in FIG. 7-12 may readily be disposed on either the first 4 or second 6 jaw.

What is claimed is:

1. A mounting assembly for securing a cable to an edge, the mounting assembly comprising:

a first clamping jaw including an integral elongate locking element and first guides laterally disposed on opposing sides of the locking element;

a second clamping jaw including a locking channel for receiving the elongate locking element, and second guides for cooperating with the first guides;

a mounting surface for receiving and supporting a cable; and at least one mounting aperture configured to receive a fastening strap, the at least one mounting aperture is arranged relative to the mounting surface such that the fastening strap may be looped through the at least one mounting aperture and over the mounting surface to secure a cable to the mounting surface, wherein the first and second clamping jaws are arranged to receive an edge therebetween and are relatively movable towards each other in a clamping direction to a clamping configuration and the first and second guides engage to align the first and second clamping jaws and guide said relative movement in the clamping direction, and wherein the elongate locking element is configured to be inserted through the locking channel in the clamping direction and the elongate locking element and locking channel are configured to interlock to permit movement of the elongate locking element through the locking channel in the clamping direction and prevent removal in a reverse direction to hold the clamping jaws in the clamping configuration.

2. The mounting assembly according to claim 1, wherein the elongate locking element includes an engagement portion arranged to be engaged by a tensioning tool to pull the elongate locking element through the locking channel thereby pulling the clamping jaws towards each other and increasing a clamping pressure.

3. The mounting assembly according to claim 1, wherein the mounting surface is on at least one of the clamping jaws.

4. The mounting assembly according to claim 1, wherein in a first configuration the elongate locking element extends away from the first clamping jaw in a direction perpendicular to clamping axis and in a second configuration the elongate locking element is bent about a hinge portion to extend in the clamping direction.

5. The mounting assembly according to claim 1, wherein the elongate locking element includes a ratchet rack formation, and the locking channel includes a pawl formation for locking engagement with the ratchet rack.

6. The mounting assembly according to claim 1, wherein the guides of the first clamping jaw comprise at least one guide member extending from the first clamping jaw in the clamping direction and the guides of the second clamping jaw comprise at least one guide channel configured to receive said at least one guide member.

7. The mounting assembly according to claim 1, wherein the guides of the first clamping jaw comprise two guide arms extending from the first clamping jaw in the clamping direction and spaced laterally in a direction perpendicular to the clamping direction and the guides of the second clamping jaw comprise two correspondingly spaced guide channels configured to receive the respective guide arms.

8. The mounting assembly according to claim 7, wherein at least one of the guide arms includes a key formation and the corresponding guide channel is formed as a keyway for receiving the respective key to ensure correct alignment of the clamping jaws.

9. The mounting assembly according to claim 1, wherein when the first and second clamping jaws are configured such that in the clamping configuration the guides extend in the clamping direction.

10. The mounting assembly according to claim 1, wherein the at least one mounting aperture comprises a first aperture and a second aperture respectively disposed in the first and second clamping jaws, wherein the first and second apertures are arranged relative to the mounting surface such that in the clamping configuration said fastening strap may be looped through the first and second apertures and over the mounting surface to secure a cable to the mounting surface.

11. The mounting assembly according to claim 1, wherein the first and second clamping jaws are separable components.

12. The mounting assembly according to claim 1, wherein the first and second clamping jaws are arranged in the clamping configuration to receive the edge therebetween along an insertion axis and are arranged such that they are urged together against the edge in the clamping direction that is perpendicular to the insertion axis.

13. The mounting assembly according to claim 1, wherein the first and second clamping jaws include first and second clamping surfaces respectively that face each other in the clamping direction and the guides are arranged to pivotally restrain the first and second clamping jaws to maintain said arrangement as the first and second clamping jaws are urged together.

14. The mounting assembly according to claim 13, wherein the first and second clamping jaws each have a distal end and are configured such that the first and second clamping surfaces are angled inwardly towards each other along an insertion axis in a direction of the respective distal ends such that as the clamping jaws are moved to the clamping configuration the edge is initially engaged by the distal ends.

15. The mounting assembly according to claim 1, wherein the first and second clamping jaws each comprise a head section and a clamp section including a clamping surface, the clamp section extending from the head section.

16. The mounting assembly according claim 15, wherein at least one of the clamp sections comprises a main body and a high friction surface portion arranged for engagement with the edge, the high friction surface portion comprising a material having a modulus lower than an elastic modulus of the main body of said clamp section.

17. The mounting assembly according to claim 16, wherein the high friction surface portion is formed of an elastomeric material.

18. The mounting assembly according to claim 15, wherein the clamp sections curve inwardly towards each other along an insertion axis towards their distal ends.

19. The mounting assembly according to claim 18, wherein the curved clamp sections are formed of a resilient material and are configured to deform to a substantially flat configuration against an edge surface when the mounting assembly is moved to the clamping configuration.

20. A method of securing a cable to an edge utilizing a mounting assembly having a first clamping jaw that includes an integral elongate locking element and first guides laterally disposed on opposing sides of the locking element, a second clamping jaw that includes a locking channel configured to receive the elongate locking element and second guides for cooperating with the first guides, a mounting surface configured to receive and support a cable, and at least one mounting aperture configured to receive a fastening strap, the at least one mounting aperture arranged relative to the mounting surface such that the fastening strap may be looped through the at least one mounting aperture and over the mounting surface to secure a cable to the mounting surface, the method comprising:

arranging the first and second clamping jaws such that the edge is received therebetween;

inserting the elongate locking element into the locking channel;

moving the first and second clamping jaws together towards the edge in a clamping direction;

engaging the first guides with the second guides;

moving the clamping jaws to a clamping configuration in engagement with the edge;

applying a tensioning tool to the elongate locking member to pull an elongate member through the locking channel and pull the jaws together against the edge and to increase a clamping pressure against the edge;

arranging a cable on the mounting surface;

looping a fastening strap through the at least one mounting aperture and over the cable; and tightening the fastening strap to secure the cable to the mounting surface.

* * * * *